US008634377B2

(12) United States Patent
Chen et al.

(10) Patent No.: US 8,634,377 B2
(45) Date of Patent: Jan. 21, 2014

(54) METHOD FOR IMPROVED HANDOVER IN MULTIPLE INTERFACE APPLICATION

(75) Inventors: Beizhong Chen, Mountain View, CA (US); David W. Faucher, Guthrie Center, IA (US); Raymond B. Miller, Belmar, NJ (US); Cezary Purzynski, Manalapan, NJ (US)

(73) Assignee: Alcatel Lucent, Paris (FR)

(*) Notice: Subject to any disclaimer, the term of this patent is extended or adjusted under 35 U.S.C. 154(b) by 356 days.

(21) Appl. No.: 12/586,980

(22) Filed: Sep. 30, 2009

(65) Prior Publication Data

US 2011/0075631 A1 Mar. 31, 2011

(51) Int. Cl.
*H04W 4/00* (2009.01)
*H04J 3/24* (2006.01)

(52) U.S. Cl.
USPC .......................... 370/331; 370/338; 370/349

(58) Field of Classification Search
USPC ........................................................ 370/331
See application file for complete search history.

(56) References Cited

U.S. PATENT DOCUMENTS

2002/0009066 A1* 1/2002 Shimizu et al. ............... 370/338
2010/0268804 A1* 10/2010 Aso et al. ..................... 709/222
2011/0007711 A1* 1/2011 Muhanna et al. ............. 370/331

OTHER PUBLICATIONS

WO2009066438 A1 : Address Allocation Method, Address Allocation System, Mobile Node, and Proxy Node.*

* cited by examiner

*Primary Examiner* — Derrick Ferris
*Assistant Examiner* — Kodzovi Acolatse
(74) *Attorney, Agent, or Firm* — Harness, Dickey & Pierce

(57) ABSTRACT

A method is provided for establishing a backup interface among multiple interfaces serving a mobile node, for a handover that is undetectable in advance. The invention methodology operates to cause a Foreign Agent associated with the multiple interfaces to keep a binding record of each of the multiple interfaces for which the mobile node has successfully completed the registration process. A novel Mobile IP extension is also added to facilitate the backup FA binding of the invention methodology.

10 Claims, 4 Drawing Sheets

METHOD FOR IMPROVED HANDOVER IN MULTIPLE INTERFACE APPLICATION

FIELD OF THE INVENTION

The present invention generally relates to handoffs in wireless communication systems.

BACKGROUND OF THE INVENTION

In the communications art, different wireline/wireless technologies—e.g. Ethernet, WiFi, 3GPP, 3GPP2, WiMAX—have evolved down distinct paths, each providing services with different characteristics. For example, WiFi is mainly deployed indoors while 3GPP provides a much larger service area outdoors. To provide better coverage and better user experience, some vendors provide proprietary dual-mode mobile terminals which allow users to access two different networks, e.g. WiFi and GSM.

Relatedly, IEEE 802.21 (Media Independent Handover, "MIH") is a standards development directed to the enablement of handover and interoperability between heterogeneous network types including both 802 (e.g. WiFi/WiMAX) and non-802 (e.g., 3GPP) networks. A principle aim of the 802.21 standard is to provide a generic solution for intelligent handover between these technologies. FIG. 1 shows the basic MIH function which resides between the Data Link layer (Layer 2 (L2)) and the Network layer (Layer 3 (L3)) of the OSI Network Model. MIH can provide L2 handover related information, e.g., Link-up, Link-down, Link-Handover-Imminent, etc., to upper layers to facilitate L3 handover.

Wireless communication systems, generally, use a geographically-dispersed network of interconnected base stations to provide wireless connectivity to mobile nodes. The network operates according to standards and/or protocols that allow the mobile nodes to roam between the interconnected base stations via handover from base station to base station, as the mobile node's location changes. One example of a communication protocol that supports user mobility is Mobile Internet Protocol (Mobile IP), which is an Internet Engineering Task Force (IETF) protocol that allows mobile nodes to move from one network to another while maintaining a permanent IP address throughout the session that requires mobility. A mobile node that operates according to Mobile IP is assigned a permanent IP address called a home address on its home network (the assignment being for the duration of the session), and a care-of address that identifies the current location of the mobile node within a network and its subnets.

A home agent (hereafter, generally designated "HA") stores information about mobile nodes that have a permanent home address in the home agent's network. Foreign agents (hereafter, generally designated "FA") store information about mobile nodes that are visiting the foreign agent's network, and advertise care-of addresses to these mobile units.

Each time a mobile node moves to a different network, it acquires a new care-of address that corresponds to a target FA. In the home network, the HA associates each permanent home address of the mobile node with its current care-of address. The mobile node sends the HA a message to establish a binding between the home address and care-of address each time it changes its care-of address, using a Mobile IP protocol defined in IETF RFC 3344. When traffic is sent to the mobile node, the packets are addressed to, and initially received by the HA, and forwarded via tunneling mechanisms to the appropriate care-of address—typically the FA at the mobile node's current location.

In Version 4 of the Mobile IP protocol (sometimes designated hereafter as "MIPv4"), when a mobile node (hereafter generally designated as "MN") enters a MIPv4 network, it searches for an FA that can act as the MN's Care of Address (CoA). Through a registration procedure initiated by the MN, a tunnel is established between the FA and the HA for that MN. All data from Correspondent Nodes (CN) destined for that MN are intercepted by the HA and forwarded over this tunnel to the current CoA. The receiving FA is then responsible for delivering the data to the MN. As described above, the Mobile IP mechanism provides a transparent solution for mobility management such that a CN need not know where the MN resides (e.g. home or roaming).

When an MN roams to a different type of access network, e.g., from a WLAN network to a 3GPP network, this is called a vertical handover. (Relatedly, if the types of networks are the same before and after the handover, this is called a horizontal handover.) Handovers can also be classified by layers, e.g. Layer 2 or Layer 3. Because a handover involves many operations, e.g., physical reconnection, protocol negotiation, reconfiguration, etc., it is inevitable that performance deterioration will occur during the handover. Among such performance issues, latencies are introduced during a handover process that include L2 disconnection detection, L2 reconnection, L3 re-connection, etc. Typically, an L3 handover occurs after an L2 handover is completed.

A timing diagram for a representative MN handover in MIPv4 is shown in FIG. 2. The timing events depicted in the figure, indicated in the figure as "ti" are defined below.

t1: L2 disconnection detection
t2: L2 connection up (e.g. power up, association)
t3: MN solicitation
t4: FA advertisement
t5: MN registration request
t6: FA processing and MN-FA authentication
t7: Registration forwarding
t8: Home Agent (HA) processing
t9: Authentication
t10: HA processing (e.g. tunnel setup)
t11: Registration reply
t12: FA processing
t13: Registration reply
t14: MN update (e.g. routing table update)
t15: Connection resumed Many methods have been proposed to reduce the various types of handover latencies, such as switching the order of L2/L3 handover or reducing the absolute latency value by localizing the L3 registration processing, etc. In accord with the order switching idea, a methodology called Low-latency Handover contemplates a Preregistration method wherein the MN registers with a new FA through the current FA before attaching to a new network. Hence, in that approach, the MN does not need to wait until the L2 handover is completed to start the L3 handover. Ideally, the L3 handover latency, generally t3~t14 in FIG. 2, can be removed and therefore a quicker handover is achieved.

Alternatively, an approach called Regional Registration suggests a hierarchical architecture which alleviates the high latency of MN-HA registration and authentication by setting a regional GFA (Gateway Foreign Agent) to provide a quicker registration locally. However, all of the abovementioned algorithms are designed based on the assumption that there is only one type of interface in the MN and that the handover is between two FAs of the same interface type—i.e., a horizontal handover. For vertical handover, however, these methods are not applicable without extensive modification. Note that different access technologies typically use different authentication mechanisms.

SUMMARY OF INVENTION

To reduce the handover latency in an MN with multiple interfaces connected to the same FA, an embodiment of the present invention provides for a backup interface for a handover that is undetectable in advance. To that end the invention methodology operates to cause each FA to keep a binding record of multiple interfaces (from the same MN), which have successfully completed the registration process. The inventors denote this concept as Interface Simultaneous/backup FA Binding. A novel Mobile IP extension is also added to facilitate the backup FA binding of the invention methodology.

In a particular embodiment, the FA visitor list is expanded to include records of all registered interfaces, along with their link-layer addresses, and a marking of the interface currently active. The new Mobile IP extension described above, and characterized as a simultaneous FA binding extension, is then applied by a receiving FA to determine its processing of the call.

BRIEF DESCRIPTION OF THE FIGURES

The teachings of the present invention can be readily understood by considering the following detailed description in conjunction with the accompanying drawings, in which.

DETAILED DESCRIPTION

In the following description, for purposes of explanation and not limitation, specific details are set forth such as particular architectures, interfaces, techniques, etc., in order to provide a thorough understanding of illustrative embodiments of the invention. However, it will be apparent to those skilled in the art that the invention may be practiced in other illustrative embodiments that depart from these specific details. In some instances, detailed descriptions of well-known devices, circuits, and methods are omitted so as not to obscure the description of described embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

The invention is described hereafter in terms of its application in a Mobile IP system, and for convenience of nomenclature, the invention methodology is generally characterized by the term Simultaneous FA Backup-Mobile IP, or SFB-MIP but such terminology should not be construed to limit the invention scope in any way. Note also that the invention methodology is described in terms of bi-casting, but it should be understood that more than two interfaces can be used to send duplicated packets.

Figure 3:
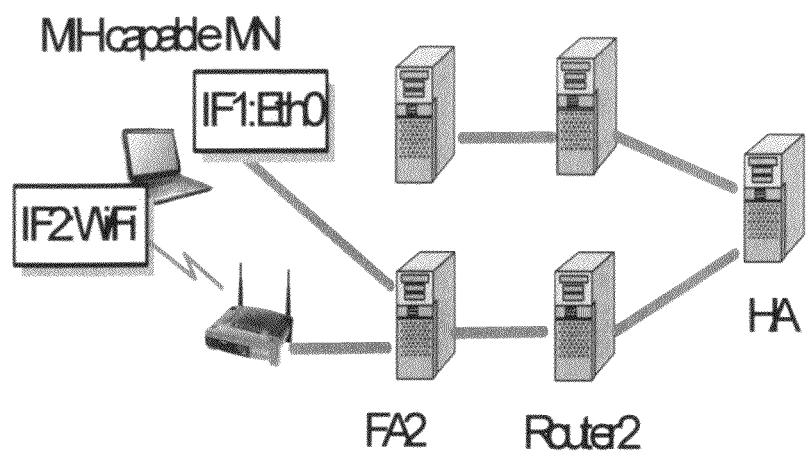
FIG. 3 provides a schematic depiction of the Media Independent Handover function as applied in the invention methodology.

As a preface to discussion of the invention methodology, a typical operation of a multiple-interface MN connecting to a single FA will be briefly described for context. Consider a user with a laptop equipped with both a wireline Ethernet connection and a wireless WiFi card. Potential network connections for such a user are illustrated in FIG. 3. For this illustrative case, it is assumed that MIPv4 service is available and that the same FA serves both the Ethernet and WiFi connections provided within a generally contiguous area— for example an office building visited by the user. While at a fixed location in the building, the user likely prefers to use Ethernet which typically provides better connection quality than wireless connection; however, when leaving the fixed location, the connection must be transferred to WiFi.

Generally, unplugging an Ethernet cable (as would occur in leaving the fixed location) is not pre-detectable and therefore the L2 disconnection is an unexpected event. If the user is using the client MIPv4 without MIH, the connection will be lost for a relatively long period of time, until the MIPv4 detects the disconnection by methods known in the art. For the case where MIH is available, however, a quicker handover can be achieved because the MIH can notify the MIPv4 that the L2 connection is lost. In that circumstance, using the WiFi interface (IF2), as illustrated in FIG. 3, the Mobile IP client in the MN starts an L2-L3 handover process. That handover process corresponds with the t1~t15 stages of the timing diagram shown in FIG. 2. The L3 handover occurs after L2 handover is completed.

Figure 1:
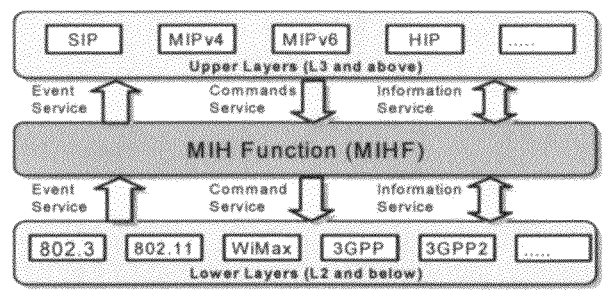
FIG. 1 schematically depicts operation of the IEEE 802.21 (Media Independent Handover function.
Figure 2:
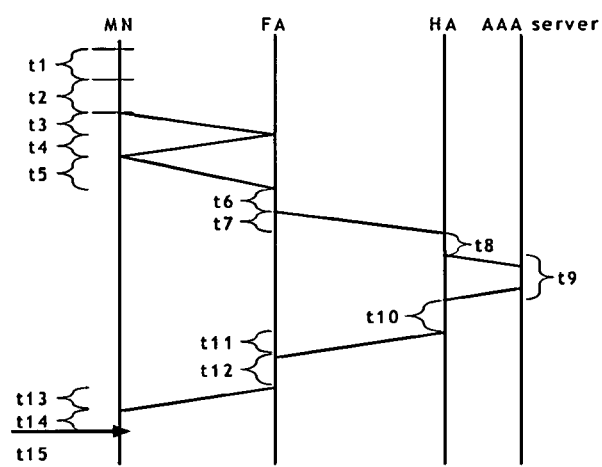
FIG. 2 shows a timing diagram for a handover sequence involving Mobile IP.

The inventors have observed that, if the IF2 interface could be made available for handover all the time, no matter when the IF1 connection is lost, the MN could switch to IF2 nearly immediately, eliminating most of the handover delay associated with the t2~t15 stages of the FIG. 2 timing diagram. Thus, a considerably faster handover could be achieved. As disclosed and described herein, the inventors have developed a methodology to achieve that goal of the alternate interface being available for handover at any time.

In the standard MIPv4 process, when a new registration is authenticated, the FA updates its binding record. If the link-layer address is changed, the new link will replace the current one. To illustrate that process, and again referring to the connection configuration of FIG. 3, assume that the MN is using the Ethernet interface of FIG. 3 (IF1/Eth0) and it sends a registration request over the WiFi interface (IF2/WiFi). The FA forwards the request to the HA. From the HA's perspective, the registration request is not different from the one previously sent over the Eth0 interface (i.e., it looks like a re-registration rather than a move) and only the expiration time is updated. But for the FA, the link-layer address in the binding record (visitor list) will be replaced by the link layer address of IF2 after the HA reply is received. The result is that the connection is forced to move to IF2 at once, even if the IF1 (Eth0) is still connected. This is an undesirable result.

As suggested above, in order to reduce the handover latency, an always-ready backup interface is needed for a handover that is undetectable in advance. To achieve that goal, the inventors have developed a concept of Interface Simultaneous/backup FA Binding, which operates to cause the FA to keep a binding record of multiple interfaces (from the same MN), which have successfully completed the registration process. To facilitate the simultaneous interface binding of the invention, the FA visitor list is expanded to include records of all registered interfaces, along with their link-layer addresses. The FA also operates to mark the interface that is currently active.

To enable the FA operation in establishing the multiple-interface binding records, the invention methodology provides a new Mobile IP extension to be applied for registration (and preregistration) requests from a given MN. Prior to a detailed discussion of this new FA backup binding extension, it may be useful to briefly review the structure of an MIPv4 registration message.

A typical MIPv4 registration message contains a fixed header followed by one or more extension headers, one of which must be an authorization-enabling extension, i.e. between the MN and HA (MN-HA). For a MIPv4 registration sent by the MN, the typical ordering of extensions are as follows; extensions to be processed by the HA, followed by an authorization-enabling extension (MN-HA), followed by extensions to be processed by the FA, followed by an authentication extension (MN-FA). The idea is that the FA related extensions can be processed locally by the FA and stripped before forwarding the MIPv4 registration message to the HA. The MN-FA authentication extension protects the UDP payload up to and including the MN-FA authentication extension (less the authenticator value) whereas the MN-HA authorization-enabling extension protects the UDP payload up to and including the MN-HA authorization-enabling extension (less the authenticator value).

Figure 4:
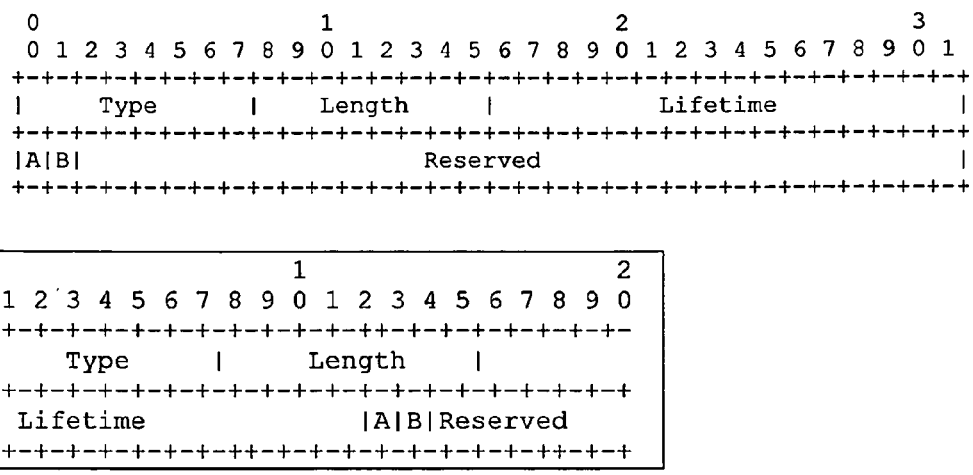
FIG. 4 provides an illustration of simultaneous FA binding extension according to the invention methodology.

The new MIPv4 extension added by the invention metnodology, denoted a simultaneous FA binding extension, is schematically illustrated in FIG. 4. The units of the illustrated simultaneous FA binding extension are as follows:

Type: Identifies this simultaneous FA binding extension.
Length: Indicates the length (in bytes) of the data fields within this extension. The length does not include the Type and Length bytes.
Lifetime: The time in seconds before the binding with the FA is considered expired. A zero value indicates a MN's request for deregistration of the specific interface over which this extension is sent. (Note that this is different from the lifetime of MN registered at HA).
A: Active bit. If the "A" bit is set, this link is active and should be used to forward traffic. If it is unset, this link is not ready for transmission.
B: Bi-casting. If this bit is set, the FA uses all active interfaces to forward traffic. If it is unset, only the interface over which the latest registration is sent will be the active interface.

Since the new simultaneous FA binding extension of the invention is to be processed by the FA, it will be located between the MN-HA and the MN-FA extensions and will be stripped from the Mobile IP registration message before being forwarded to the HA. The existence of the new extension in the MIPv4 registration message is an indication to the FA that the MN wants to operate in the backup binding mode, as described herein. The A and B bits in the extension determine how it is to be processed by the FA. Note that the first registration need not include this extension since there is only one connection.

The basic flow for the set up of the simultaneous FA binding of the invention is now described, again using the connection diagram of FIG. 3 for illustration. Assume the MN is connected to a FA using IF1 (the Eth0 connection) and it begins to register for an IF2 connection (WiFi). At that point, the following steps are carried out:

1. The MN sends a registration request with the new extension over IF2.
2. The FA checks the registration and finds this extension. The FA can use information within the registration request (e.g. Home Address or NAI) to identify whether this request matches a prior registration from the same MN (in this case from IF1). This technique also supports an MN having multiple independent registrations with the same FA but over different interfaces (e.g. by specifying a different Home Address or NAI).
   a. The FA forwards the registration to the HA for authentication and timer update, removing the simultaneous FA binding extension.
   b. The FA updates the visitor list. An exemplary updating of the FA visitor list is shown in Table 1

TABLE 1

| Exemplary FA Visitor List | | | | |
|---|---|---|---|---|
| IP | MAC | Active | Lifetime | Auth |
| IF1 xx.xx.xx.xx | xx:xx:xx:xx | 1 | xx | 1 |
| IF2 | xx:xx:xx:xx | 0 | xx | 0 |

3. The HA sends its reply.
4. The FA updates its visitor list again based on the reply. If the HA accepts the request, the FA marks the corresponding entry in the visitors list as authenticated (Auth). If the HA denies the request, IF2 needs to be removed from the visitor list.
5. The FA relays the HA reply to the MN using the interface over which the original request was received (IF2).
6. The MN updates its interface record.
7. When the MN needs to use IF2—e.g., when MIH detects that IF1 is unplugged and notifies Mobile IP, the Mobile IP sends a registration request through IF2 with the "A" bit (of the simultaneous FA binding extension) set and "B" bit unset, to inform the FA that it should now use IF2 to forward packets. Meanwhile, the MN does the necessary local update, e.g. Routing Table update. Note that if "A" bit and "B" bit are both set, the FA enters a bi-casting state and both interfaces are active.
8. Because IF2 is now marked as "Auth", the FA sets IF2 as active and deactivates IF1, and sends an intermediate reply to MN. After this, the MAC of IF2 is used to send packets and the transmission is moved to IF2, thereby eliminating most of the latency from the t3~t15 events of the FIG. 2 timing diagram. Additionally, the FA forwards the new registration (without the extension) to the HA for normal processing (this include forwarding any HA registration reply to the MN when it is received from the HA).

The basic rules for processing of the "A" and "B" bits are:
(1) "A" bit set, "B" bit set: add this interface to the set of active interfaces.
(2) "A" bit set, "B" bit unset: activate this interface and deactivate all other interfaces, just as the step 7 in the flow sequence described above.
(3) "A" bit unset: this case represents either pre-registering an interface that is not presently intended to be activated, re-registering an interface that is not presently intended to be activated, deactivating an active interface but not removing it from the FA visitor list or deactivating an active interface and removing it from the FA visitor list; in either case, the "B" bit is ignored.

The processing steps associated with the setting of the "A" and "B" bits are further summarized in tabular form in Table 2.

TABLE 2

"a"/"B" Bit Processing

| A | B | Description |
|---|---|---|
| 0 | X | This is used for the following cases<br>1. pre-registering an interface (i.e. add to FA visitor list but not active)<br>2. re-registering an interface that is not active (e.g. lifetime about to expire)<br>3. deactivate an interface but don't remove it from the FA visitor list<br>4. deactivate an interface and remove it from FA visitor list.<br>Which one applies is determined by the value of the lifetime in this extension. A non-zero value is for cases #1-#3 while a value of zero depicts case #4. In the first three cases, an entry is either added to the FA visitor list or updated if one already exists. |
| 1 | 0 | This represents a request to activate this interface as the only active interface (i.e. all traffic over other bindings cease). |
| 1 | 1 | This represents a request to activate this interface but in a way that does not affect current bindings. In other words, traffic will be sent over this interface in addition to any other active bindings (i.e. bi-casting, or more accurately n-casting) |

After two interfaces from the same MN are bound to a FA according to the method of the invention, that FA is characterized as being in an FA-backup-binding state for that MN.

In this state, when a MN activates an interface, it sends to the FA a Mobile IP registration with the FA binding extension (as described previously) and with the "A" bit of the extension set. The FA then forwards the Mobile IP registration (less the extension) to the HA and sends an intermediate reply to the MN. Since the MN has already been authenticated, the reply is used to notify the MN that it can begin using the new interface immediately (i.e. needs not to wait for the Mobile IP registration reply).

For simplicity of presentation, the basic flow described above is based on the case with only two interfaces present. However, it should be understood, and will be apparent to those skilled in the art of the invention, that the methodology of the invention can readily be extended for MNs with greater than two interfaces. Similarly, although the invention has been described in terms of an illustrative embodiment using Ethernet and WiFi interfaces, it should be clear that the invention methodology can be extended to other sets of interfaces—e.g., EVDO and WiMax, and all such applications are intended to be within the scope of the invention.

As a matter of clarity, it is noted that, in order to send the FA binding extension as part of its registration request, the MN needs to know whether the interfaces available to it are connected to the same FA. This can be easily determined by checking the agent advisement or reply to the MN solicitation.

To deregister an interface, typically the MN sends a registration request that includes this FA binding extension with a zero-lifetime over the interface that needs to be deregistered. Alternatively, in the absence of an explicit deregistration message sent from the MN, the FA may operate to remove a dormant interface upon the expiration of a timer. One other option is that the MN may send a registration request without the FA binding extension to exit the FA-backup-binding state, and, therefore, all other bound interfaces are deregistered at the FA.

The method of the invention may also provide FA bi-casting if multiple interfaces are active at once. In that case, packets are duplicated, properly framed for each active L2 connection and sent via a corresponding interface. Such bi-casting according to the invention methodology is characterized as FA bi-casting, which is unlike HA bi-casting in that the packets are duplicated in the FA, rather than in HA. It may be possible to achieve a better transmission performance using FA bi-casting in the presence of high data error rate in interfaces.

Finally, it is noted that although multiple interfaces are bound to a single FA according to the invention methodology, it does not follow that all bound interfaces need to be powered up all the time. The bound-but-inactive interfaces can go to power-saving mode when they are inactive. They just need to wake up periodically to refresh the binding timer at FA.

Herein, the inventors have disclosed a method for providing reduced latency in handovers among multiple interfaces aligned with a common Foreign Agent. Numerous modifications and alternative embodiments of the invention will be apparent to those skilled in the art in view of the foregoing description.

Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention, and that the exclusive use of all modifications which come within the scope of the appended claims is reserved.

The invention claimed is:

1. A method for managing hand-overs of a mobile node among multiple interfaces providing network access to the mobile node, the method comprising:
   keeping a binding record of the multiple interfaces, the binding record kept by a Foreign Agent associated with the multiple interfaces, the mobile node being associated with an active one of the multiple interfaces and a non-active one of the multiple interfaces; and
   causing the Foreign Agent to establish a back-up binding for the non-active one of the multiple interfaces in response to a request transmitted from the mobile node, the request being transmitted by the mobile node to the Foreign Agent through the non-active one of the multiple interfaces and the request including a simultaneous binding extension, the simultaneous binding extension indicating (i) whether the associated active interfaces forward traffic intended for the Foreign Agent and (ii) an expiration time for the binding with the Foreign Agent, the back-up binding established in the binding record while the binding record indicates that the mobile node is connected to the active one of the multiple interfaces.

2. The method of claim 1 wherein the request transmitted from the mobile node is implemented as an extension for a registration request from the mobile node.

3. The method as claimed in claim 1, further comprising: determining whether each of the multiple interfaces associated with the mobile node is connected to the Foreign Agent.

4. The method as claimed in claim 3, further comprising: checking a response to the request from the mobile node.

5. The method as claimed in claim 1, wherein the binding record includes whether an interface of the multiple interfaces is active or non-active.

6. The method as claimed in claim 5, wherein an interface that is active forwards traffic intended for the mobile node.

7. The method as claimed in claim 1, wherein two or more interfaces are simultaneously listed as active in the binding record.

8. The method as claimed in claim 1, wherein the request includes an additional extension to a fixed header of the request, the additional extension indicating that the non-active one of the multiple interfaces is not requesting to be active.

9. The method as claimed in claim 8, wherein the additional extension is located between an authorization-enabling extension (MN-HA) and an authentication extension (MN-FA).

10. The method as claimed in claim 1, wherein the request includes an additional extension to a fixed header of the request, the additional extension indicating that the non-active one of the multiple interfaces is requesting to be active at the same time as the active one of the multiple interfaces.

* * * * *